(12) United States Patent
Nakano et al.

(10) Patent No.: US 8,574,107 B2
(45) Date of Patent: Nov. 5, 2013

(54) CHAIN TENSIONER

(75) Inventors: Yoshikazu Nakano, Osaka (JP); Kohei Kunimatsu, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 275 days.

(21) Appl. No.: 13/074,309

(22) Filed: Mar. 29, 2011

(65) Prior Publication Data
US 2011/0256970 A1 Oct. 20, 2011

(30) Foreign Application Priority Data

Apr. 19, 2010 (JP) ................................. 2010-095730

(51) Int. Cl.
*F16H 7/08* (2006.01)

(52) U.S. Cl.
USPC .......................................... 474/110

(58) Field of Classification Search
USPC .................. 474/110, 100, 101, 109, 111, 140
See application file for complete search history.

(56) References Cited

U.S. PATENT DOCUMENTS

| | | | |
|---|---|---|---|
| 4,504,251 A * | 3/1985 | Mittermeier .................. | 474/110 |
| 4,674,996 A * | 6/1987 | Anno et al. .................. | 474/110 |
| 6,609,985 B2 * | 8/2003 | Todd et al. ................... | 474/109 |
| 6,729,986 B2 * | 5/2004 | Kurohata et al. ............. | 474/110 |
| 8,066,598 B2 * | 11/2011 | Bulloch ........................ | 474/104 |
| 2002/0052259 A1 | 5/2002 | Nakakubo et al. | |
| 2003/0139235 A1 * | 7/2003 | Yamamoto et al. ........... | 474/109 |
| 2006/0166769 A1 * | 7/2006 | Yoshida ........................ | 474/110 |
| 2007/0032322 A1 * | 2/2007 | Beardmore ................... | 474/110 |
| 2007/0082773 A1 * | 4/2007 | Yamada et al. ............... | 474/109 |
| 2008/0064546 A1 * | 3/2008 | Ullein .......................... | 474/110 |
| 2009/0209376 A1 * | 8/2009 | Kurematsu et al. ........... | 474/110 |
| 2010/0093473 A1 * | 4/2010 | Bulloch ........................ | 474/104 |

FOREIGN PATENT DOCUMENTS

JP 2002-130401 5/2002

* cited by examiner

*Primary Examiner* — William E Dondero
*Assistant Examiner* — Robert T Reese
(74) *Attorney, Agent, or Firm* — Howson & Howson LLP

(57) ABSTRACT

In a hydraulic tensioner, a tensioner housing is provided with an oil outflow channel communicating with a high pressure oil chamber formed by a plunger and the tensioner housing. A control valve in the oil outflow channel can be adjusted manually or automatically to optimize the damping performance of the tensioner in different engines and under different operating conditions, thereby obviating individualized machining of tensioner components to achieve optimum damping.

2 Claims, 7 Drawing Sheets

CHAIN TENSIONER

CROSS REFERENCE TO RELATED APPLICATIONS

This application claims priority on the basis of Japanese Patent Application 2010-095730, filed on Apr. 19, 2010. The disclosure of Japanese Patent Application 2010-095730 is incorporated by reference.

FIELD OF THE INVENTION

The invention relates to a chain tensioner, comprising a tensioner housing in which a cylindrical plunger-accommodating hole is formed, and a cylindrical plunger, slidable in the plunger-accommodating hole and protruding therefrom through an opening in a wall of the housing. In a chain tensioner, the plunger and the plunger-accommodating hole cooperatively form a high pressure oil chamber, and the plunger is biased in the protruding direction in order to maintain adequate tension in a transmission chain such as the timing chain of an internal combustion engine.

BACKGROUND OF THE INVENTION

In a typical application of a chain tensioner, a transmission chain is engaged with, and driven by, an engine crankshaft sprocket, and is in driving relationship with one or more sprockets provided on engine valve-operating camshafts. A part of the chain, usually the part that moves from the crankshaft sprocket toward a camshaft sprocket, is in sliding relationship with shoe of a movable tensioner lever, which is biased by a tensioner in a direction to maintain tension in the chain.

As shown in FIG. 8, in a conventional engine timing drive, a timing chain C is engaged with a driving sprocket S1, mounted on a crankshaft, and with a pair of driven sprockets, S2 and S3, mounted on valve-operating camshafts. The timing drive includes a stationary chain guide G2, mounted on bolts B1 and B2, and a movable chain guide G1, pivoted on a bolt B, and pressed against the chain by the plunger of a tensioner 500 in order to maintain tension in the chain.

An example of a known chain tensioner is described in United States Patent Application publication No. 2002/0052259, published May 2, 2002. As shown in FIG. 7, the known chain tensioner 500 comprises a tensioner housing 510 having a cylindrical plunger-accommodating hole 511 in which a plunger slides. The plunger has a cylindrical exterior surface through part of its length, which fits closely the cylindrical interior surface of the plunger-accommodating hole. The plunger protrudes through an opening at one end of the plunger-accommodating hole. A coil spring 540 extends into a hole 521 in the plunger 520, and is compressed between the bottom of the plunger-accommodating hole 511 and the end of hole 521 in the plunger. The coil spring serves as a biasing means, continuously urging the plunger 520 in its protruding direction.

Oil is supplied under pressure to the plunger-accommodating hole 511 through an oil inflow channel 512 provided in the housing, and fills a high pressure oil chamber 513 formed by the plunger-accommodating hole 511 and the plunger 520. As illustrated in FIG. 5, slow leakage of oil from the high pressure oil chamber 513 through a small gap between the exterior of the cylindrical part of the plunger and the cylindrical internal wall of the plunger-accommodating hole 511 causes damping of the reciprocating movement of the plunger 520. The damping property of the tensioner depends on factors such as oil viscosity and the dimensions of the gap between the plunger and the cylindrical wall of the plunger-accommodating hole.

As shown in FIG. 7, the plunger 520 is also provided with a relief valve 522, which allows oil to flow out the high-pressure oil chamber 513 when the pressure within the chamber becomes excessive, as disclosed in United States Patent Application publication No. 2002/0052259.

The plunger damping effect is important for the suppression of fluctuations in chain tension and sinusoidal vibrations of the chain. However, the effectiveness of the damping action is highly dependent, not only on the engine, but on changes in the operating conditions of a given engine. Accordingly, adjustments must be made for optimum damping. However, the gap between the plunger 520 and the plunger-accommodating hole 511 is determined when the tensioner is designed, with the primary objective of ensuring that the plunger reciprocates smoothly and uniformly. Hence it is difficult to make different adjustments for optimum damping of tensioners individually.

Although it is possible to control damping by providing a V-shaped groove 523 on the side the plunger 520 as shown in FIG. 6, and to control damping property by varying the width and depth of the groove, it is necessary to determine the appropriate groove dimensions for each engine in which the tensioner is to be used, and, once the damping property has been set, it is impractical to change it to accommodate different operating conditions.

Accordingly, the damping properties of a tensioner have been a compromise, arrived at by determining a setting that provides adequate, but not optimum, damping under a variety of operating conditions. In addition, it has not been practical heretofore to correct the damping properties of a tensioner when they depart from designed damping properties as a result of machining errors.

Another problem with the known chain tensioner shown in FIG. 7 is that the relief valve 522, which is provided as a countermeasure against excessive pressure in the oil chamber 513, cannot be used to adjust the tensioner's damping properties.

SUMMARY OF THE INVENTION

The invention addresses the above-described problems by providing a chain tensioner that suppresses fluctuation in tension and sinusoidal vibrations of a chain by optimizing a tensioner's damping properties without the need for machining tensioners individually to accommodate different engines and different operating conditions.

The chain tensioner, according to the invention comprises a tensioner housing and a plunger. A cylindrical plunger-accommodating hole is formed in the tensioner housing. The plunger is a cylindrical plunger, slidable in the plunger-accommodating hole, and protruding therefrom through the opening in the wall of the tensioner housing. The plunger and the plunger-accommodating hole cooperatively form a high pressure oil chamber. Biasing means, preferably a coil spring, urge the plunger in the protruding direction. The tensioner has an oil inflow channel through which oil can be supplied to the high pressure oil chamber, and an oil outflow channel through which oil can be discharged from the high pressure oil chamber. The tensioner includes a control valve for controlling the amount of oil discharged through the oil outflow channel.

An advantage of the oil discharge control valve is that, by changing the aperture of the valve either manually or automatically, it becomes possible to optimize the plunger damping property, to suppress fluctuations of tension and sinusoidal vibrations of the chain, and to accommodate different engines and different operating conditions, without custom machining of tensioner components individually.

Another aspect of the invention is the inclusion of a check valve for blocking flow of oil from the high pressure oil chamber through the oil inflow channel. By blocking reverse flow of oil, it becomes possible to prevent the damping property from being affected by the reverse flow through the oil inflow channel and to adjust the damping property of the tensioner more accurately by adjustment of the aperture of the control valve.

Still another aspect of the invention is the inclusion of an actuator for adjusting the control valve to control the amount of oil discharged through the oil outflow channel. When the aperture of the control valve is adjusted by an actuator, it becomes possible to adjust the damping properties of the tensioner while the tensioner installed on an engine, and to achieve more accurate adjustment of the damping property.

When the tensioner is mounted on an engine and arranged to control tension in a timing chain, a controller may be utilized to control the actuator during operation of the engine. Because the actuator is operable by the controller during operation of the engine it is becomes possible to achieve dynamic adjustment of the damping property of the tensioner to take into account the operating conditions of the engine.

The actuator can be operated by means of a piezoelectric element, and in this case, more accurate adjustment of damping can be achieved and operational failures due to vibration, engine heat, and similar causes are less likely to occur. Moreover, the piezoelectric element can be small in size, so that the advantages of the controlled discharge of oil from the high pressure chamber can be realized without significantly increasing the size of the actuator.

DETAILED DESCRIPTION OF THE PREFERRED EMBODIMENTS

Figure 1:
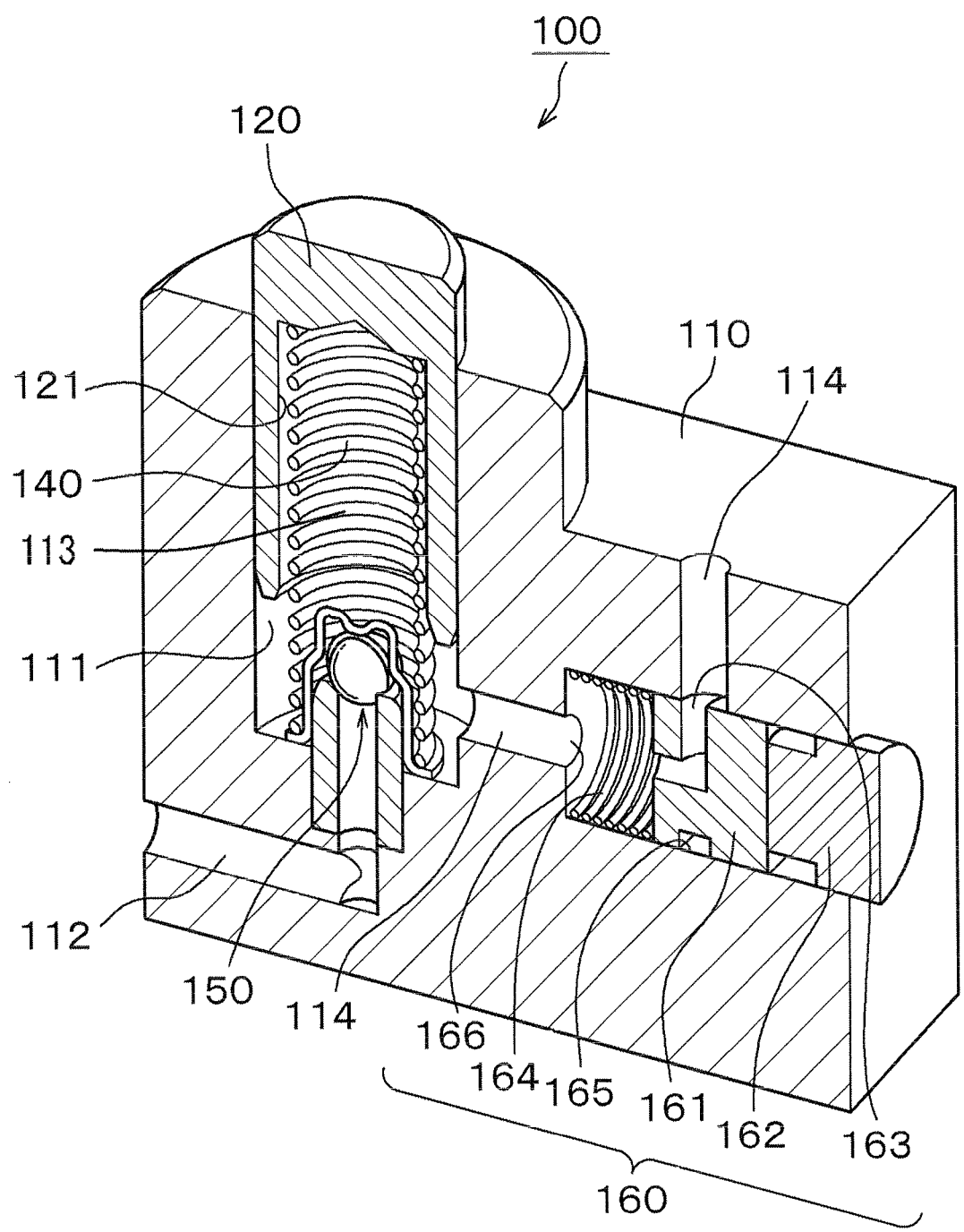
FIG. 1 is a perspective sectional view of a chain tensioner according to a first embodiment of the invention.
Figure 2:
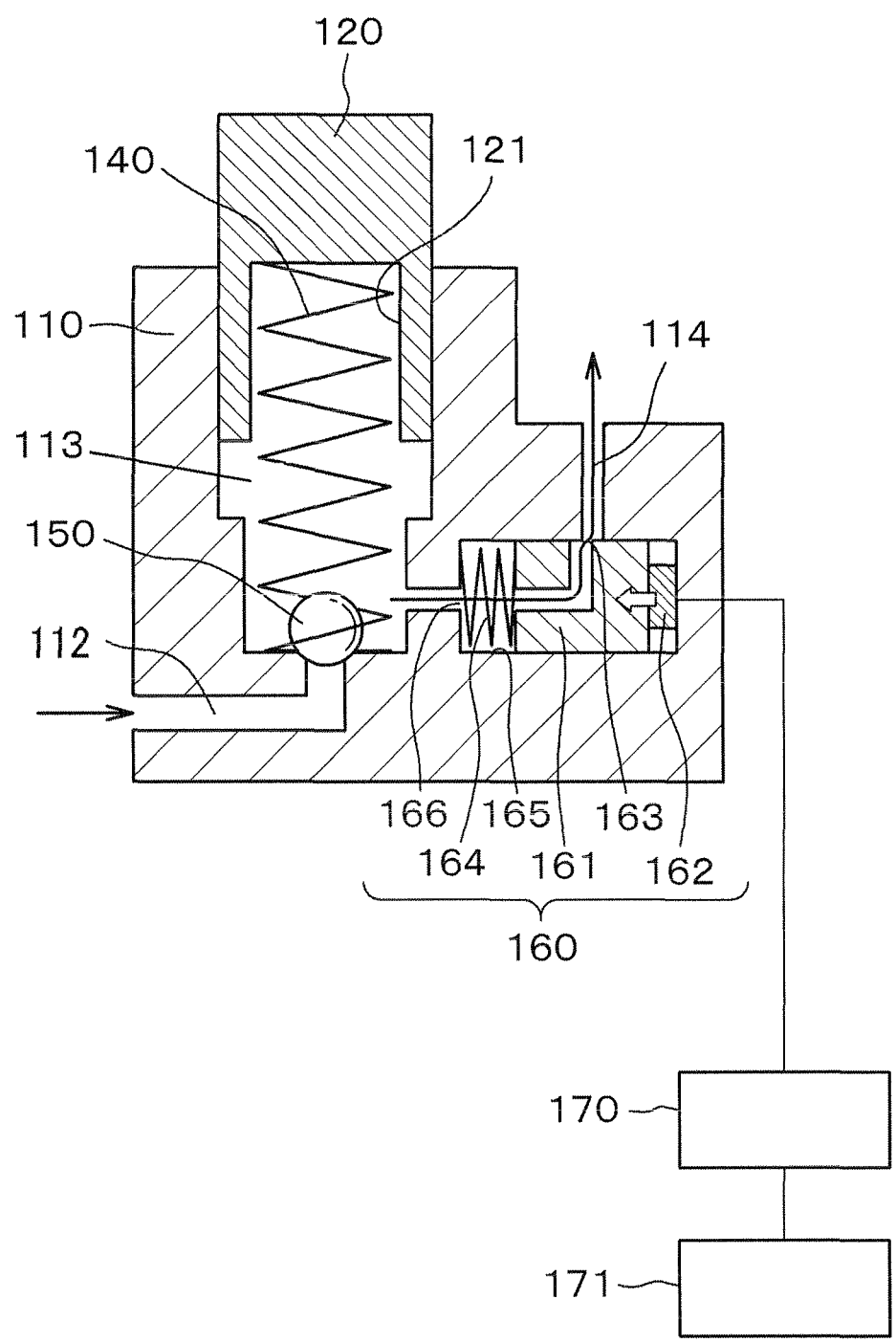
FIG. 2 is a schematic sectional view of the chain tensioner of the first embodiment of the invention.

As shown in FIGS. 1 and 2, a chain tensioner 100 comprises a housing 110 having a cylindrical plunger-accommodating hole 111 having an end opening in a wall of the housing. A plunger 120, at least part of the outer peripheral surface of which is cylindrical, is slidable in the plunger-accommodating hole 111 and protrudes therefrom through the end opening. A plunger-biasing coil spring 140, partly within a spring-receiving hole 121 inside the plunger, is in compression between and end of hole 121 adjacent the protruding end of the plunger, and the bottom of the plunger-accommodating hole 111.

The housing 110 is provided with an oil inflow channel 112 for supplying oil under high pressure to a high pressure oil chamber 113 formed by the plunger 120 and the plunger-accommodating hole 111. A check valve 150 prevents the oil from flowing from the plunger-accommodating hole through the oil inflow channel 112.

The housing is also provided with an oil outflow channel 114 for discharging oil from the high pressure oil chamber 113. The oil outflow channel 114 is provided with a control valve 160, which is capable of adjusting an amount of oil discharged through channel 114.

The control valve 160 includes a spool 161 movable in an axial direction within a cylindrical spool chamber 165. The chamber 165 has an inlet port 166 opening in the axial direction of the chamber and connecting to a part of channel 114 leading from the high pressure oil chamber 113 and an output port 163 opening in the radial direction and connecting to apart of channel 114 leading from the spool chamber to the exterior of the tensioner housing. A spool 161, which is reciprocable within the spool chamber 165, adjusts the aperture of the output port 163. A biasing spring 164 urges the spool 161 in one direction, in this case, the direction in which the aperture of the output port 163 increases, and an actuator 162 is provided for moving the spool 161 against the biasing force exerted by spring 164.

Damping of the reciprocating movement of the plunger 120, which is dependent on the rate of flow of oil from chamber 113, is determined not only by the gap between the plunger-accommodating hole 111 and the plunger 120, but also by the aperture of the valve 160 in the oil outflow channel 114. Accordingly, even if the gap between the plunger-accommodating hole 111 and the plunger 120 is optimally designed for smooth sliding of the plunger in the plunger-accommodating hole, it becomes possible to make significant adjustments in the damping properties of the tensioner by adjusting the control valve 160 and thereby changing the rate of flow of oil through the outflow channel 114.

As shown in FIG. 2, a controller 170 can be provided for controlling the operation of the actuator 162. With the controller, it is possible to adjust the damping property of the tensioner dynamically, so that the damping property corresponds to actual operating conditions. The optimum damping property can be determined by calculations based on input from a sensor 171, which can sense parameters such as the revolution rate of the engine and oil temperature.

The sensor 171 may also be arranged to detect fluctuations of tension and vibration of the chain, and thereby provide feedback control enabling the controller 170 to optimize the fluctuations of tension and vibration of the chain.

Figure 3:
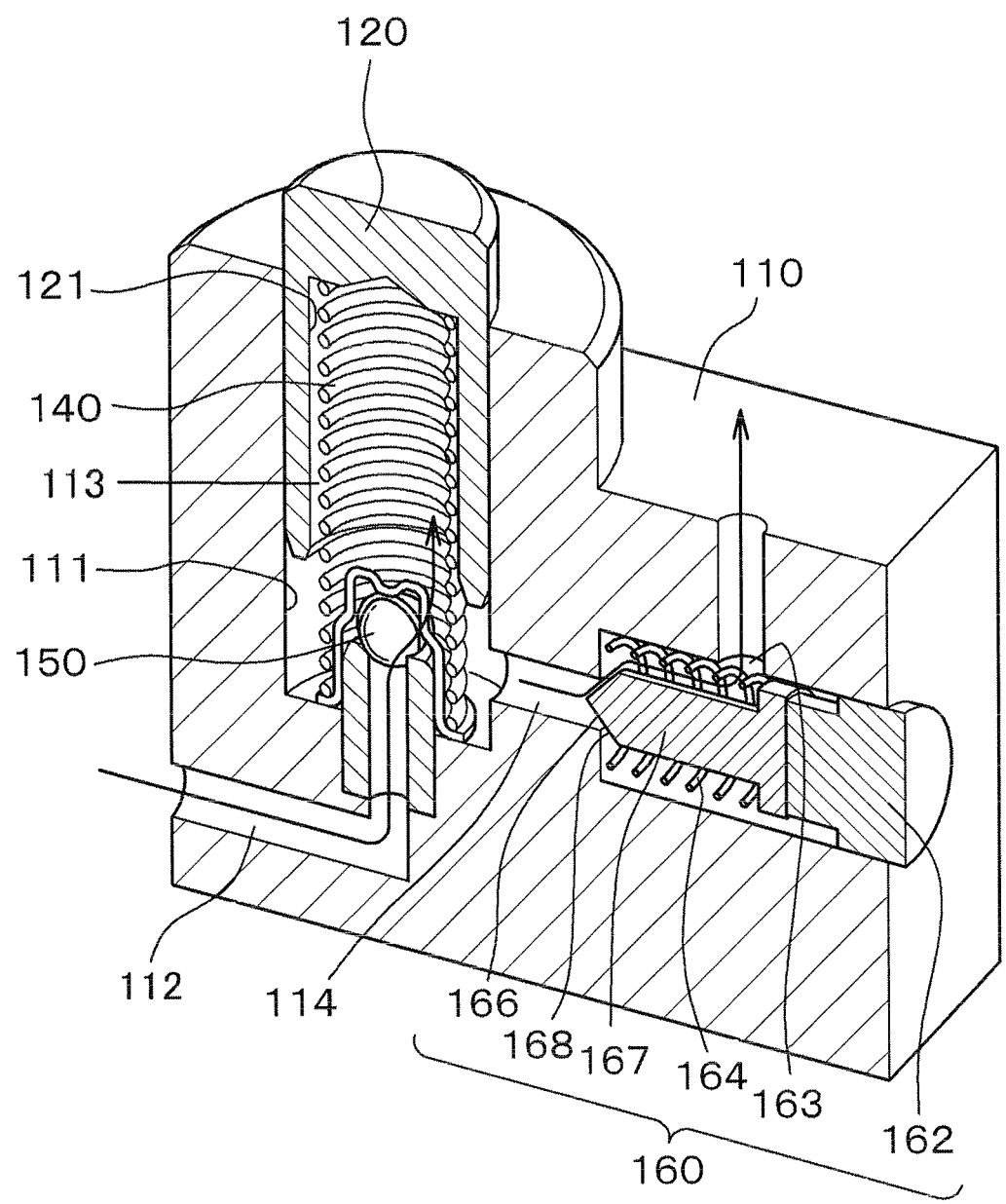
FIG. 3 is a perspective section view of a chain tensioner according to a second embodiment of the invention.
Figure 4:
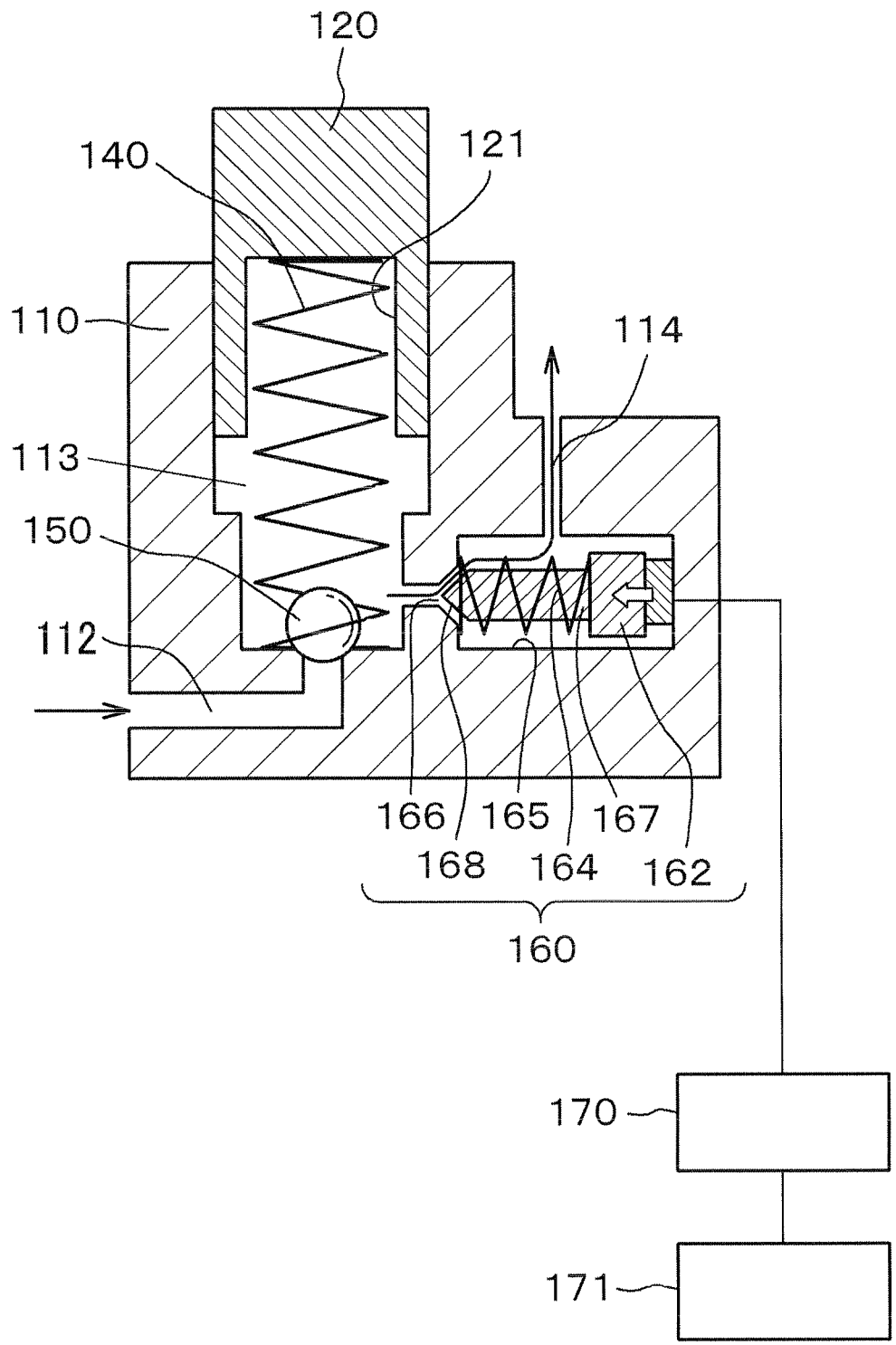
FIG. 4 is a schematic sectional view of the chain tensioner of the second embodiment of the invention.
Figure 5:
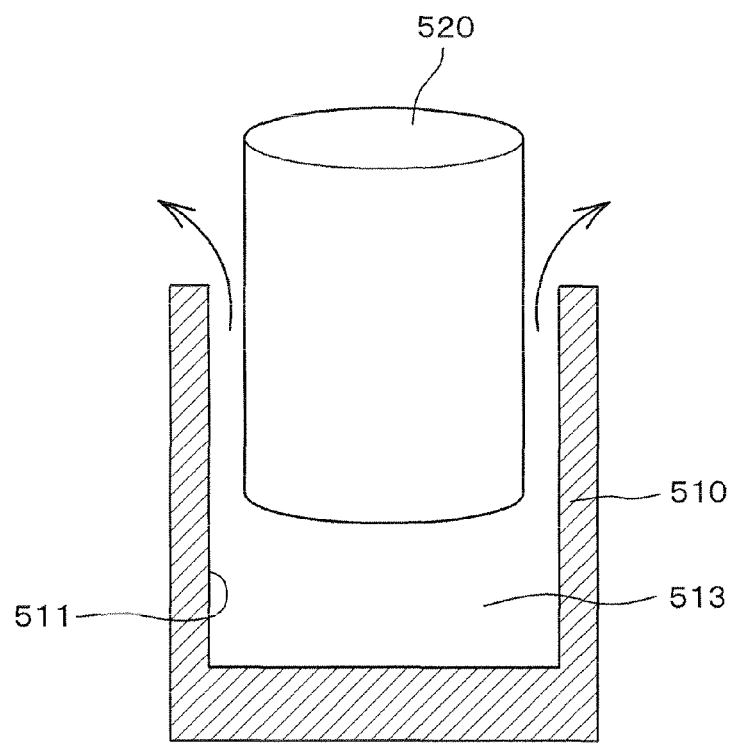
FIG. 5 is a schematic diagram explaining the operation of a prior art chain tensioner.
Figure 6:
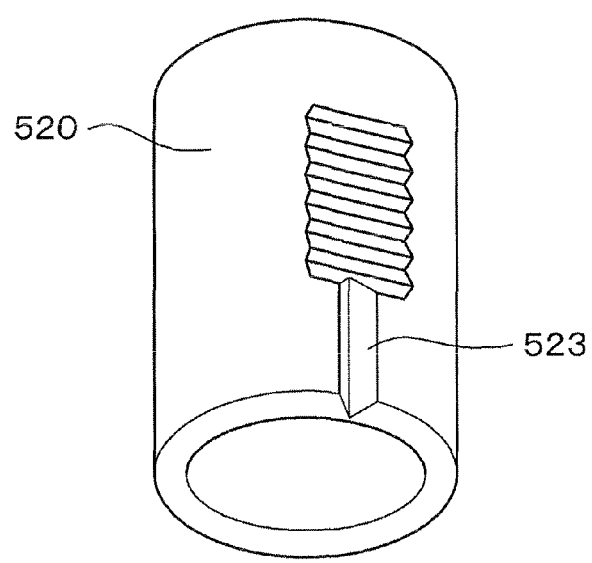
FIG. 6 is a perspective view of the plunger of the prior art chain tensioner.

In a second embodiment of the invention, as shown in FIGS. 3 and 4, instead of spool valve, the control valve 160 is in the form of an axially movable needle valve, having an element 167 with a tapered end 168 that cooperates with a port 166 of outflow channel 114 by movement in the axial direction to adjust the valve aperture.

The actuator 162 may take any of various forms and arrangements as long as it is capable of effecting reciprocating movement of the needle valve element 167. For example, it is possible to operate the actuator a piezoelectric element, in which case advantage can be taken of the small size of the piezoelectric element to reduce the size and weight of the tensioner. For purposes of illustration, the size of the control valves in FIGS. 1-4 is exaggerated. In practice the control valves can be very small in size.

In a case in which dynamic adjustment of the damping property of the tensioner is not important, the needle valve or the second embodiment, or the spool valve of the first embodiment, can be adjusted manually by means of a screw or similar mechanism instead of by means of an the actuator.

Figure 7:
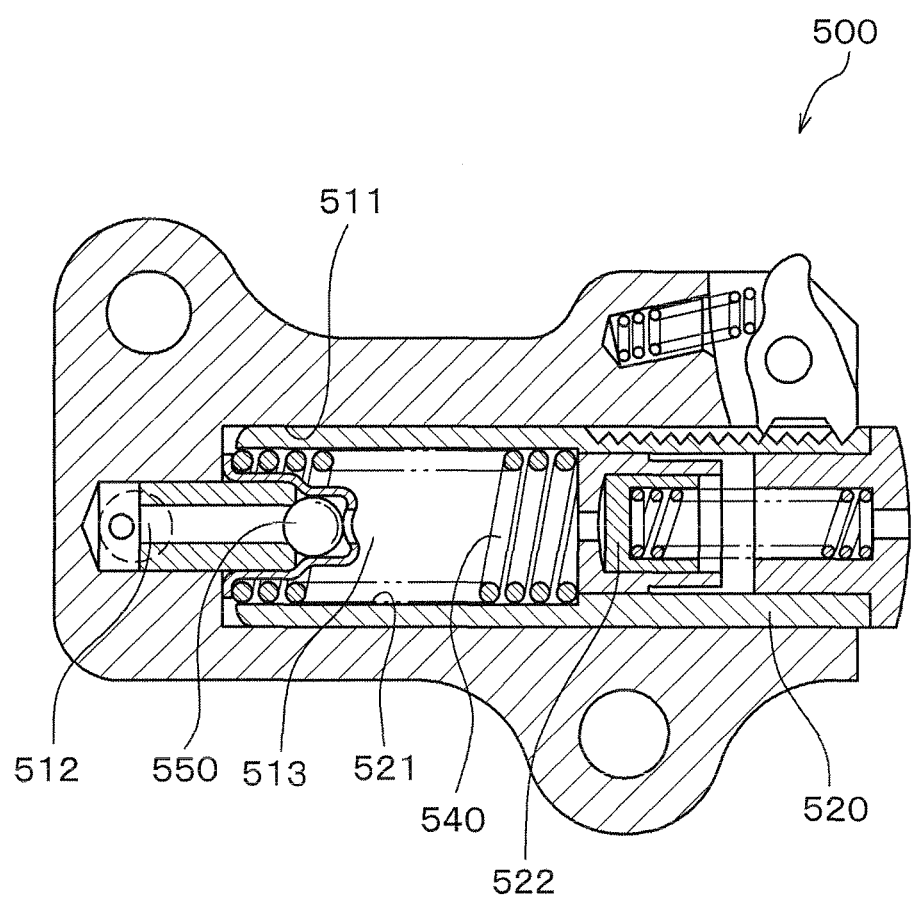
FIG. 7 is a section view of a prior art chain tensioner.
Figure 8:
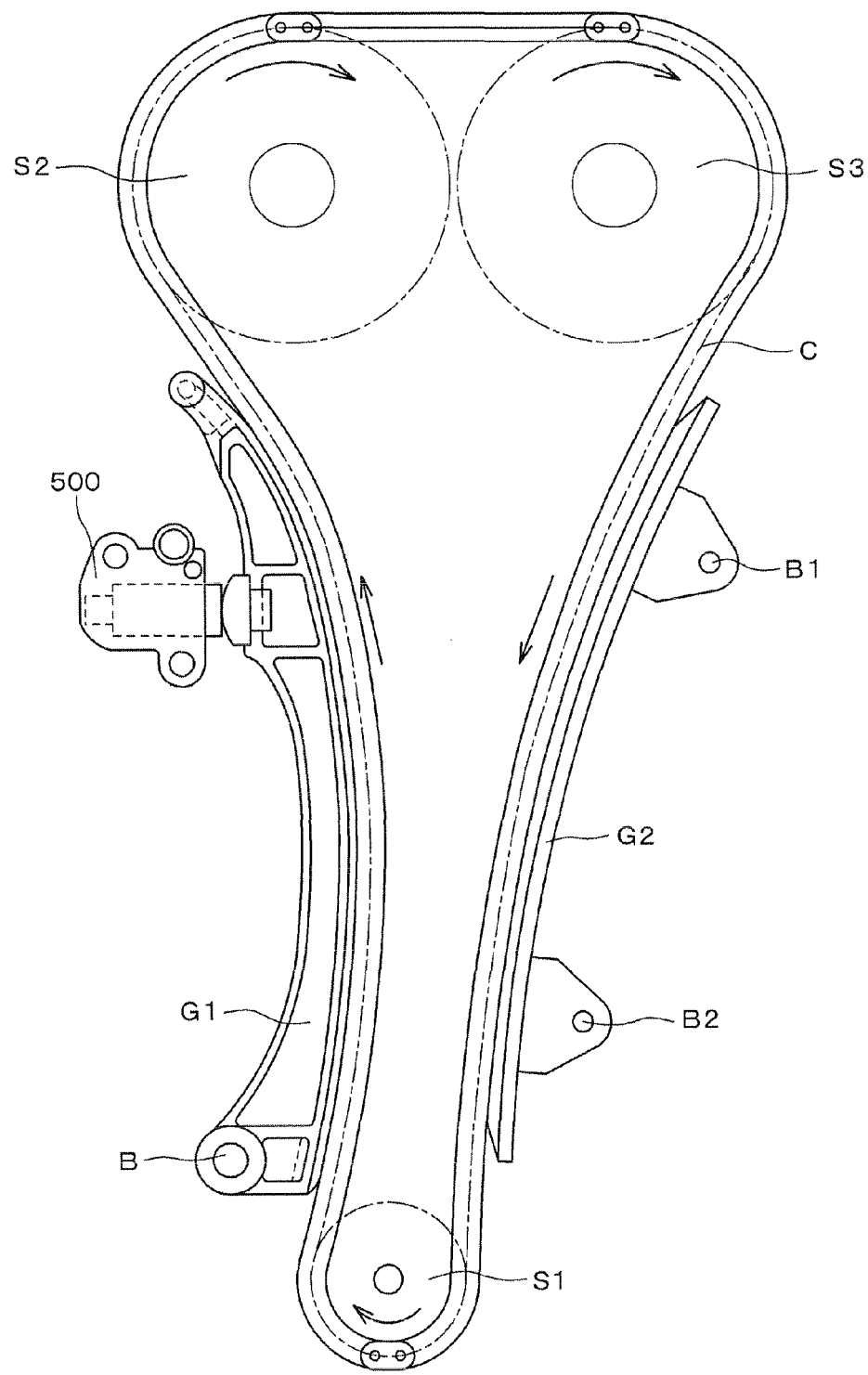
FIG. 8 is a schematic elevational view of a timing chain transmission of an engine incorporating a tensioner.

In either of the first and second embodiments described above, and in modifications thereof, a ratchet mechanism or a relief valve, or both, as shown in FIG. 7, can be provided In any embodiment, the chain tensioner suppresses fluctuations in tension and sinusoidal vibrations of the transmission chain by enabling optimization of the damping properties of the tensioner without the need to machine tensioner parts individually and differently to accommodate different engines and different operating conditions.

The tensioner housing and the plunger of the chain tensioner according to the invention may be composed of any of a variety of materials as long as the material has sufficient strength. It is preferable to use ferrous materials such as steel and cast iron because of their strength, workability and low cost.

What is claimed is:

1. A chain tensioner, comprising:
    a tensioner housing in which a cylindrical plunger-accommodating hole is formed, said hole having an opening in a wall of the tensioner housing;
    a cylindrical plunger slidable in said plunger-accommodating hole and protruding therefrom through said opening in a protruding direction, the plunger and said plunger-accommodating hole cooperatively forming a high pressure oil chamber; and
    biasing means for biasing the plunger in said protruding direction;
    wherein the tensioner has an oil inflow channel through which oil can be supplied to said high pressure oil chamber, a check valve in said oil inflow channel and arranged to allow flow of oil from a part of the oil inflow channel on an upstream side of the check valve into said high pressure oil chamber on a downstream side of the check valve and to block flow of oil from said high pressure oil chamber to said part of the oil inflow channel on the upstream side of the check valve, and an oil outflow channel through which oil can be discharged from said high pressure oil chamber through a path separate from said part of the oil inflow channel on the upstream side of said check valve, the oil outflow channel having an inlet end, said inlet end being open to the high pressure oil chamber on the downstream side of the check valve; and
    wherein the tensioner includes a control valve in said oil outflow channel for controlling the amount of oil discharged through said oil outflow channel,
    said control valve comprising a spool chamber having a cylindrical wall extending along an axial direction, an inlet port at a location remote from said inlet end of the oil outflow channel for receiving oil from said high pressure oil chamber, an outlet port opening radially to the cylindrical spool chamber, a spool fitting the cylindrical wall of the spool chamber and reciprocable within said spool chamber along said axial direction, said spool having an internal spool channel having an inlet opening in communication with said inlet port and an outlet opening, wherein said outlet opening is communicable with the outlet port of the spool chamber, said spool being positioned to adjust the aperture of said outlet port as the spool moves along said axial direction, an actuator for moving said spool along said axial direction, a sensor for sensing at least one engine operational parameter from the group of parameters consisting of engine revolution rate and engine oil temperature, and a controller responsive to said sensor for controlling said actuator to effect axial movement of said spool.

2. The chain tensioner according to claim 1, wherein said actuator is operated by means of a piezoelectric element.

* * * * *